(12) United States Patent
Olarescu (10) Patent No.: US 9,571,007 B2
(45) Date of Patent: Feb. 14, 2017

(54) METHOD FOR REDUCING A NUMBER OF SWITCHING CYCLES WHEN CONTROLLING A MULTIPHASE CONVERTER

(71) Applicant: DIEHL AKO STIFTUNG & CO. KG, Wangen (DE)

(72) Inventor: Nicola-Valeriu Olarescu, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 235 days.

(21) Appl. No.: 14/362,432

(22) PCT Filed: Nov. 29, 2012

(86) PCT No.: PCT/EP2012/004921
§ 371 (c)(1),
(2) Date: Jun. 3, 2014

(87) PCT Pub. No.: WO2013/079198
PCT Pub. Date: Jun. 6, 2013

(65) Prior Publication Data
US 2015/0016170 A1 Jan. 15, 2015

(30) Foreign Application Priority Data
Dec. 3, 2011 (DE) .................. 10 2011 120 297

(51) Int. Cl.
| | |
|---|---|
| *H02M 7/5395* | (2006.01) |
| *H02M 7/5383* | (2007.01) |
| *H02M 7/537* | (2006.01) |
| *H02M 7/00* | (2006.01) |
| *H02P 21/06* | (2016.01) |
| *H02M 7/5387* | (2007.01) |

(52) U.S. Cl.
CPC ............. *H02M 7/5395* (2013.01); *H02M 7/00* (2013.01); *H02M 7/537* (2013.01); *H02M 7/5383* (2013.01); *H02M 7/53871* (2013.01); *H02P 21/06* (2013.01)

(58) Field of Classification Search
CPC .................................................. H02M 7/5395
USPC ......................................................... 363/132
See application file for complete search history.

(56) References Cited

U.S. PATENT DOCUMENTS

| | | | | |
|---|---|---|---|---|
| 2006/0152205 A1* | 7/2006 | Tang | ................. | H02M 3/1584 323/284 |
| 2009/0309523 A1* | 12/2009 | Ikei | .......................... | H02P 3/12 318/380 |
| 2011/0040519 A1 | 2/2011 | Yeh | | |

* cited by examiner

Primary Examiner — Matthew Nguyen
Assistant Examiner — Trinh Dang
(74) Attorney, Agent, or Firm — Laurence A. Greenberg; Werner H. Stemer; Ralph E. Locher (57) ABSTRACT

A method for controlling a polyphase inverter that includes a number of half bridges connected into an intermediate voltage circuit and center taps between switching elements. By cyclically switching the switching elements, the respective center taps of the half bridges are connected to an upper intermediate circuit rail or to a lower intermediate circuit rail of the intermediate voltage circuit according to the principle of pulse width modulation. The switching elements of at least one half bridge are driven in a modified manner, at least in some time intervals, in that the switching pulses of at least two consecutive periods of the pulse width modulation are concatenated directly in time as one switching pulse. In this way, the switching frequencies of the correspondingly driven switching elements and thus the switching losses of the latter can be further reduced.

14 Claims, 10 Drawing Sheets

METHOD FOR REDUCING A NUMBER OF SWITCHING CYCLES WHEN CONTROLLING A MULTIPHASE CONVERTER

BACKGROUND OF THE INVENTION

Field of the Invention

The invention relates to a method for controlling a polyphase inverter, which comprises a number of half-bridges switched into a DC link and comprising center taps between switching elements, wherein, by clocked switching of the switching elements, the respective center taps of the half-bridges are connected to an upper DC link busbar or to a lower DC link busbar of the DC link in accordance with the principle of pulse width modulation. Such control is used in particular for supplying power to a polyphase alternating field system. The alternating field system can in this case be an AC machine operated as motor or generator or an AC grid. In particular, the invention also relates to the supply of power to a three-phase AC motor.

Figure 1:
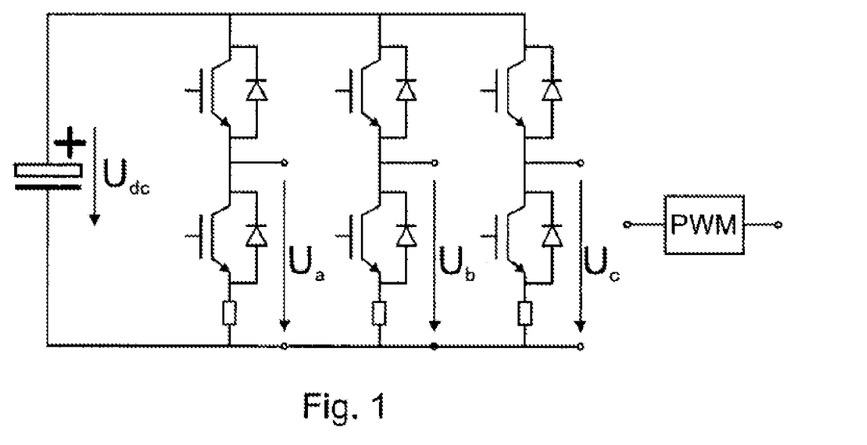
FIG. 1 shows the circuit diagram of a known three-phase inverter.

A polyphase inverter for generating output voltages for an alternating field system from a DC link has long been known from the prior art. FIG. 1 shows such an inverter for a three-phase rotating field system. The inverter illustrated comprises three half-bridges, each having two pairs of in each case one switching element and one diode connected in parallel. Contact is made with the individual phases of the rotating field system at the center taps in each case between the pairs of a half-bridge. The voltages required for the rotating field system are provided by the potential differences of the individual phases with respect to one another. By alternately switching the two switching elements of a half-bridge, the center tap of the respective phase is alternately clamped to the upper or the lower DC link potential or connected to the upper or lower DC link busbar.

The driving of the in total six switching elements, of which in each case two are distributed among one of the three half-bridges of the inverter, by means of pulse width modulation is also known, in which regard reference is made by way of example to Handley, P. G; Boys, J. T; "Practical real-time PWM modulators: an assessment", IEE Proceedings B, Electric Power Applications, Volume 139, pp. 96 ff., Issue 2, March 1992. As switching elements, modern inverters almost exclusively have switchable power semiconductors. Such power semiconductors used are, in addition to field-effect transistors, MOSFETs (Metal Oxide Semiconductor Field-effect Transistors) and bipolar transistors, in particular so-called IGBTs (Insulated-Gate Bipolar Transistors). The latter combine the advantages of field-effect transistors and bipolar transistors.

During the pulse width modulation (PWM), the average potential or the average voltage with respect to a reference potential, for example $U_a$ corresponding to FIG. 1, is set for the phase of a half-bridge by alternating the switching states of the corresponding switching elements within a predetermined period duration. In other words, in the case of pulse width modulation, the duty factor is modulated at a constant frequency. The value of the output voltage of a period duration in this case results by averaging of the respectively set switching states or from the ratio of the switching times of the clamping to the upper DC link potential and clamping to the lower DC link potential.

Permissible switching states of the inverter are, for in each case one half-bridge, "TopOn", i.e. upper switching element on and lower switching element off, "Bot(-tom)On", i.e. lower switching element on and upper switching element off and "Deadtime" if both of the switching elements are switched off. The last switching state of "Deadtime" is usually only set for negligibly short time periods (approximately 1% duration) between the states "TopOn" or "BotOn". Therefore, given a negligible deadtime, alternately "TopOn" for the time $T_{top}$ and then "BotOn" for the time $T_{bot}=T_p-T_{top}$ is set within a period duration $T_p$ (for example 100 μs). If the voltages of the respective half-bridges $U_a$, $U_b$ and $U_c$ corresponding to FIG. 1 are toward the lower branch of the DC link, between whose branches the voltage $U_{dc}$ is present, a pulse control factor of the respective half-bridge of $\tau=T_{top}/T_p$ results. The average voltage then results by way of example for the half-bridge a as $$U_a=\tau_a \cdot U_{dc}.$$

During a steady-state operation of the rotating field system, the setpoint potential differences to be generated or the setpoint voltages between the three phases are generally three-phase and sinusoidal. In the case of a three-phase alternating current, the phase difference between the individual phases is in each case 120°. The pulse control factors of the three half-bridges of the inverter are then generated by the following type of rule:

$$\tau_a = \hat{\tau} \cdot \cos(\omega t) + \tau_0$$

$$\tau_b = \hat{\tau} \cdot \cos\left(\omega t - \frac{2\pi}{3}\right) + \tau_0$$

$$\tau_c = \hat{\tau} \cdot \cos\left(\omega t - \frac{4\pi}{3}\right) + \tau_0.$$

where $\hat{\tau}=\hat{u}_{ref}/U_{dc}$ denotes the amplitude of the modulation, $\hat{u}_{ref}$ denotes the amplitude of the setpoint fundamental of the conductor voltages, $U_{dc}$ denotes the voltage of the DC link and $\tau_0$ denotes the common offset of the pulse control factors.

In order to generate the desired voltages between the individual phases of the inverter $U_{ab}=U_a-U_b$, $U_{bc}=U_b-U_c$, $U_{ca}=U_c-U_a$ by means of pulse width modulation, there are noticeably different variants. Since, in a rotating field system, only the voltages or differential signals between the phases $U_{ab}$, $U_{bc}$, $U_{ca}$ are required to be sinusoidal, a common offset $U_0$, also referred to as zero system, can be superimposed on the individual potentials $U_a$, $U_b$, $U_c$. The zero system $U_0$ is selected such that the average individual potentials on the inverter branches are in the range between zero and $U_{dc}$, or $\tau_0$ is selected such that the pulse control factors $\tau_a$, $\tau_b$ and $\tau_c$ are between zero and one. A pulse control factor of $\tau_a=0$ in this case means that the corresponding inverter branch a is not being switched or clocked, but instead is clamped permanently to the lower DC link potential throughout the period duration. A pulse control factor of $\tau_a=1$ means that the corresponding inverter branch is not being switched or clocked, but instead is clamped permanently to the upper DC link potential throughout the period duration.

It can therefore be demonstrated that it is possible, in particular for a three-phase sinusoidal system in the differential signal between the phases, to generate the individual potentials of the phases by means of pulse width modulation in such a way that in each case only two half-bridges are clocked, while the respective third half-bridge is clamped permanently to the upper or lower DC link potential or the on time of this half-bridge is either one or zero. In comparison with the modulation method, in which all three half-bridges are operated in clocked fashion so as to generate the individual potentials, the modulation method of two-phase clocking has lower switching losses. The switching frequency is reduced.

A modulation method of two-phase clocking is known, for example, from EP 0 363 514 A1. In this case, only two phases or two of the half-bridges are clocked in each case in respect of the period of the desired sinusoidal output signal for in each case 60°, while the respective third phase or half-bridge is clamped permanently to the upper or lower DC link potential. As a result, the switching losses in the switching elements are reduced in comparison with the modulation method of three-phase clocking. The switching frequency is reduced by a third. Disadvantageously, however, the line losses in the permanently clamped switching element are increased.

In another method of pulse width modulation for a three-phase inverter, so-called space vector modulation, vectors which specifically specify the respectively provided switching state in a 3-tuple are assigned to the individual possible inverter switching states. In this case, the numerical values "1" and "0" are assigned to the above-described switching states "TopOn" and "BotOn", respectively, of a respective half-bridge. The half-bridges a, b, c correspond to the first, second and third position, respectively, in the 3-tuple. Thus, for example, the 3-tuple (1, 1, 0) describes the switching state of the inverter, wherein the first half-bridge a and the second half-bridge b have the switching state "TopOn" and the third half-bridge c has the switching state "BotOn". The 3-tuples (0, 0, 0) and (1, 1, 1) are also referred to as zero vectors since all phases of the inverter are clamped either to the upper or the lower DC link potential in these switching states. The voltages or potential differences between the individual phases are therefore zero, with the result that these vectors do not have any relevance for the rotating field system. The zero vectors are to this extent inactive states of the inverter. Thus, in total six active possible switching configurations remain for a three-phase inverter.

Figure 2:
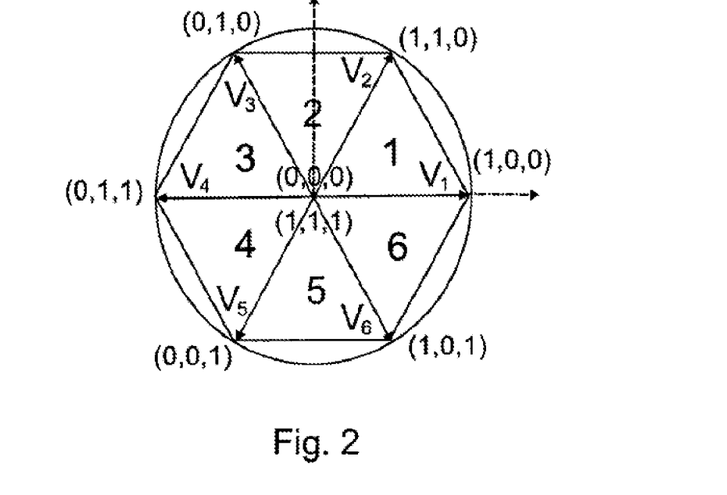
FIG. 2 shows a hexagon illustration of the space vector modulation of a three-phase inverter.

In respect of the method of space vector modulation, the vectors assigned to the active switching states are plotted corresponding to FIG. 2, wherein adjacent vectors differ in each case only in terms of a switching state of a half-bridge. The sectors spanned in each case between two adjacent vectors are numbered correspondingly. Mathematically, the method of space vector modulation corresponding to FIG. 2 is a transformation of the three-dimensional description of the output variables of a three-phase inverter into two-dimensional space. The output voltages of the inverter in this case rotate as two-dimensional vectors within the hexagon spanned by the six basic vectors of the states of the inverter, corresponding to FIG. 2.

Voltage vectors between in each case two basic vectors or active states of the inverter are generated by the on times of the active states. In order to generate voltage vectors which do not reach up to the edge of the hexagon, switching states are added to the zero vectors within the period duration. The on times of all of the selected switching states are added to give the period duration of the pulse width modulation. If no zero vectors are added, it is only possible to generate output voltages whose associated vectors end on the edge of the hexagon in the diagram corresponding to FIG. 2.

The generation of a voltage vector with intelligent connection of the zero vectors corresponds to the above-described modulation method of two-phase clocking. In each sector, the voltage values are set by adjacent basic vectors or switching states of the inverter which each differ only in terms of the switching state of a half-bridge. For example, the basic vectors (1, 1, 0) and (1, 0, 0) spanning the sector 1 only differ in terms of the switching state of the second half-bridge. If, within a sector, there is consistent switchover to in each case one zero vector, i.e. in this case either to the zero vector (1, 1, 1) or to the zero vector (0, 0, 0), either the first or the third half-bridge additionally remains permanently clamped to the upper or lower DC link potential.

At the same time, FIG. 2 shows that voltage vectors which end outside the inscribed hexagon cannot be generated. The maximum absolute value for the voltage predetermined by the basic vectors cannot be reached within the sectors. If, during driving of the inverter, voltage values are required at the output terminals which are outside the hexagon, these are limited to the so-called hexagon limit, i.e. the corresponding vectors end on the edge of the hexagon. This is then referred to as so-called over modulation. The actual required voltage or potential characteristic of a phase can no longer be generated. The voltage between two phases of the inverter has then a deformed sinusoidal characteristic, which is associated with undesired harmonics in the signal.

In the case of control or regulation of an inverter for a rotating field system by means of space vector modulation, in general the variables describing the system and in particular the output variables of the inverter are transformed into a two-dimensional coordinate system. In the case of so-called field oriented control, the two-dimensional coordinate system for describing the space vector variables rotate with the magnetic flux of the rotating field system. The coordinates of the space vector variables in the case of field-oriented control are denoted by d and q. Another possibility consists in transformation into a two-dimensional stator-fixed coordinate system. The coordinates of the space vector variables in this system are denoted by $\alpha$ and $\beta$. In order to control a rotating field system by means of space vector modulation, actually measured state variables such as terminal voltages or motor currents are measured, transformed mathematically into the respective space vector variables, and the converter is driven corresponding to the transformed space vector variables to the desired switching states for generating the voltages between the phases. In particular, reference is made here to the two-dimensional illustration for generating the output voltages corresponding to FIG. 2.

In a current-based regulation of the rotating field system, the output voltages of the inverter are driven depending on a discrepancy between the current and a setpoint current, for example by virtue of a setpoint value for the field-forming current component $i_d$ and a setpoint value for the torque-forming current component $i_q$ being preset. The regulation of a rotating field system within the d, q coordinate system has the advantage here that the current component $i_d$ resulting in a reactive power, because it forms a field, and the torque-forming component $i_q$ can be seen directly.

The driving of an inverter by means of pulse width modulation using space vector variables is described in U.S. Pat. No. 6,819,078 B2, for example. For this, a computation algorithm is specified with which, in the case of vector-regulated inverters, the pulse control factors $\tau_a$, $\tau_b$, $\tau_c$ can be calculated using simple computation operations from a setpoint voltage vector. With the algorithm specified, modulation methods both with three-phase clocking and with two-phase clocking are possible. In this case, overmodulation is identified by virtue of the fact that a negative on time for a zero vector occurs within the algorithm, which corresponds to the requirement of a voltage value outside the hexagonal limit. In the case of overmodulation, the space vector variable assigned to the voltage value is rescaled, with the result that the voltage values are again within the hexagonal limit. Overmodulation with the known associated disadvantages is therefore prevented.

Furthermore, EP 0 840 441 B1 discloses a field-oriented control of a rotating field machine, wherein the output voltages are controlled at the voltage ceiling. In order to provide voltage limitation, the magnitude of the torque-forming current component $i_q$ is reduced during regulation in the d, q coordinate system if the voltage component $U_d$ in the direction of flux reaches a limit value, and the field-forming current component $i_d$ is reduced in size if the voltage component $U_q$ perpendicular to the direction of flux reaches a further limit value. Corresponding to the limited voltage components $U_d$, $U_q$, the corresponding phase voltages of the inverter are controlled. In particular, for the limit values, the maximum available output voltage of the inverter is selected, with the result that the pulse control factors predetermined for the inverter of the half-bridges are less than "1" or the inverter is driven within the hexagonal limit. Therefore, a voltage reserve necessary for load is provided, for which purpose the field-forming and/or the torque-forming current component is reduced. Since the inverter is operated below the hexagonal limit, overmodulation is avoided, which can result in control difficulties owing to the demand for voltage values which cannot be realized.

Corresponding to EP 2 192 682 A1, it is proposed to set the voltage demand of a rotating field machine via a family of characteristics for the field-forming current $i_d$ so that the quadrature-axis controller and the direct-axis controller do not reach a control limitation. If the manipulated variables of the current controllers were to be limited by the maximum possible voltage, the setpoint current components $i_d$, $i_q$ could no longer be controlled and the response of the machine would be indeterminate. In this case, too, overmodulation is therefore deliberately avoided.

BRIEF SUMMARY OF THE INVENTION

The object of the invention consists in specifying a method for controlling an inverter by means of pulse width modulation of the type mentioned at the outset, in which method the individual inverter switching elements are subjected to as low a load as possible. The invention is intended in particular to make it possible to provide an inverter with switching elements which are as inexpensive as possible.

This object is achieved for a method of the type mentioned at the outset in accordance with the invention by virtue of the fact that the switching elements of at least one half-bridge are driven in modified form at least in time segments by virtue of the switching pulses of at least two successive periods of the pulse width modulation being arranged temporally directly next to one another as one switching pulse.

In this case, in a first step the invention is based on the consideration that the modulation methods of three-phase clocking, two-phase clocking and single-phase clocking differ from one another in respect of the switching cycles, the current conduction cycles and the distribution among the switching elements in this regard. If a switching element is switched less, its stress as a result of heating owing to switching losses is reduced at the expense of the stress owing to heating as a result of line losses. If a half-bridge is clamped permanently to the lower or the upper DC link potential, the respectively switched-on switching element of the half-bridge on one side is loaded, whereas the other switching element does not experience any stress. A modulation method which clamps a half-bridge in this way for certain periods of time on one side therefore results in increased loading of individual switching elements because the losses are distributed asymmetrically in a half-bridge. On the other hand, this circumstance is irrelevant when a connection of individual switching elements on one side is in turn distributed cyclically among all the switching elements of the inverter in the case of relatively high rotating field frequencies. The known modulation methods to this extent each have specific advantages, but also specific disadvantages.

In a second step, the invention identifies that, in all of the known modulation methods, the switching losses of the switching elements can be reduced further if, at least in time segments, the switching elements of at least one half-bridge are driven in modified form with respect to the regular PWM method, by virtue of the switching pulses of at least two successive periods of the pulse width modulation being arranged temporally directly next to one another as one switching pulse. In other words, the switching pulses of at least two successive periods of the pulse width modulation are combined during the modified control to give a single switching pulse which extends over the two periods and which has the same duration as the two individual switching pulses together. By virtue of this combination of at least two switching pulses to form a single switching pulse, the number of switching cycles is reduced since the switching changeover between the original switching pulses can be dispensed with owing to the fact that they are combined. To this extent, it is apparent that, by virtue of the cited method, the switching losses in the switching elements can be further reduced independently of the modulation methods used by the inverter.

The invention to this extent opens up the possibility of operating the inverter in particular in interaction with the known modulation methods such that switching elements which are as inexpensive as possible can be used. However, the invention can also be applied detached from specific modulation methods for controlling an inverter.

During the modified control, the theoretical duty factor of the pulse width modulation, i.e. the ratio of the pulse duration to the period duration, does not change. However, the clock frequency of the switching elements is reduced. Secondly, it is also possible to say that, during the modified control, the period duration of the pulse width modulation and therefore the frequency thereof is reduced when the periods combined by arranging the switching pulses next to one another are considered as a new PWM period.

The individual modulation methods which can advantageously be combined with the invention will be described in more detail below for better understanding with the aid of FIGS. 3-8.

FIGS. 3-8 show time characteristics of the pulse control factors $\tau_a$, $\tau_b$, $\tau_c$ of the respective half-bridges of a three-phase inverter, of the respectively selected zero system $\tau_0$ and of the difference formed $\tau_a-\tau_b$. The characteristics of the pulse control factors $\tau_a$, $\tau_b$, $\tau_c$ correspond to the characteristics of the individual potentials of the phases assigned to the respective half-bridges. The characteristic of the difference $\tau_a-\tau_b$ corresponds to the characteristic of the voltage between the phases of the corresponding half-bridges a and b.

Figure 8:
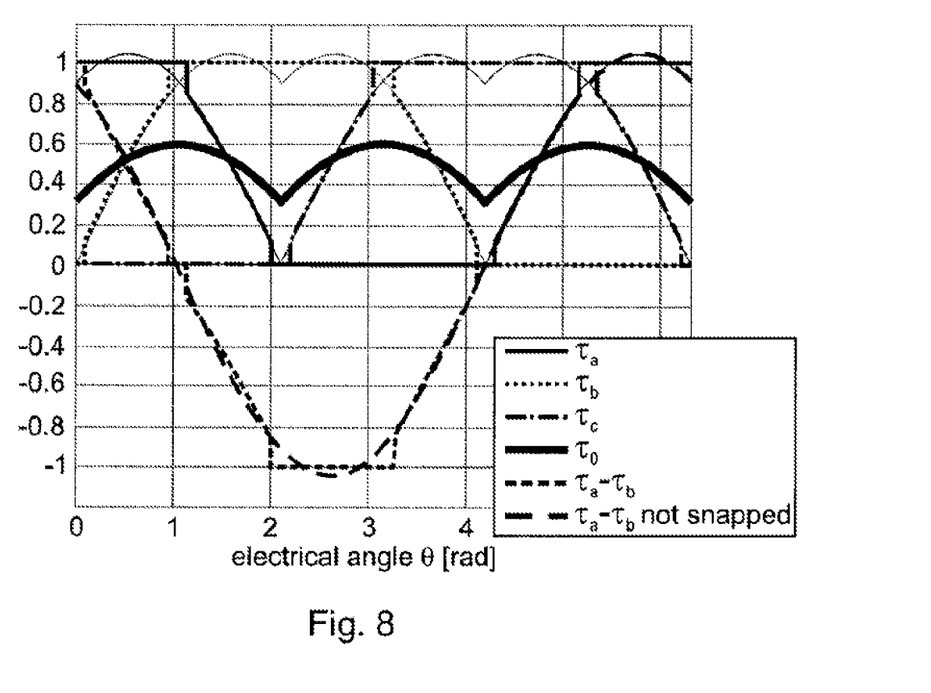

It can be seen directly that, with the exception of FIG. 8 which shows overmodulation, the difference $\tau_a-\tau_b$ has a sinusoidal characteristic, irrespective of the choice of the zero system $\tau_0$. To this extent, the degree of freedom in respect of the selection of the modulation methods can be seen if, as in the case of a rotating field system and in particular in the case of a rotating field machine, only the differential voltage between the individual phases of the inverter is of significance.

Figure 3:
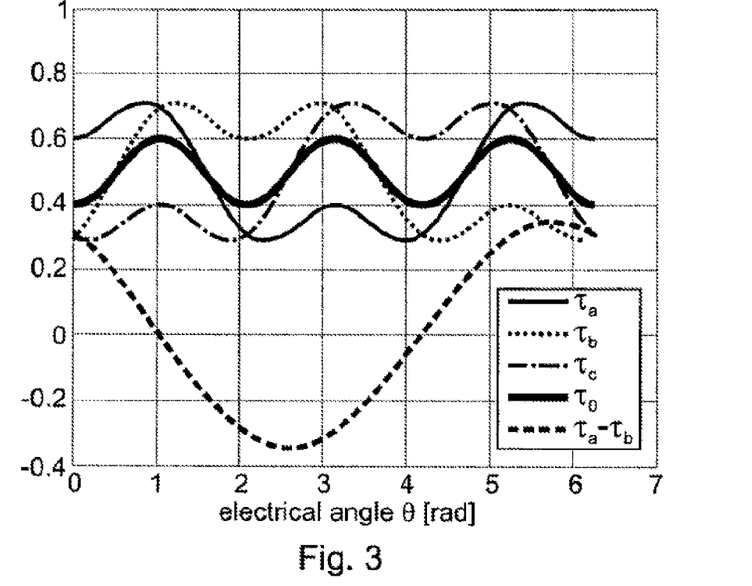
FIGS. 3-8 show the respective time characteristic of the pulse control factors of the half-bridges, the selected zero system and the phase differential signal for various modulation methods.
Figure 4:
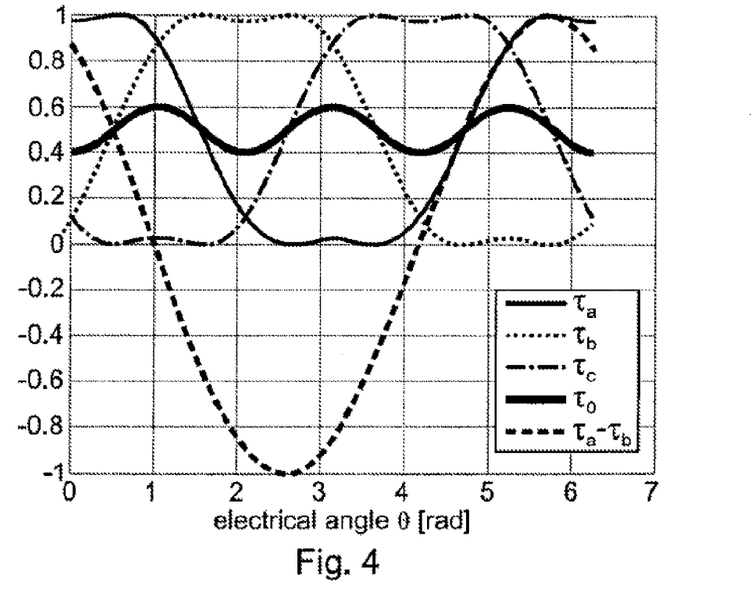
Figure 5:
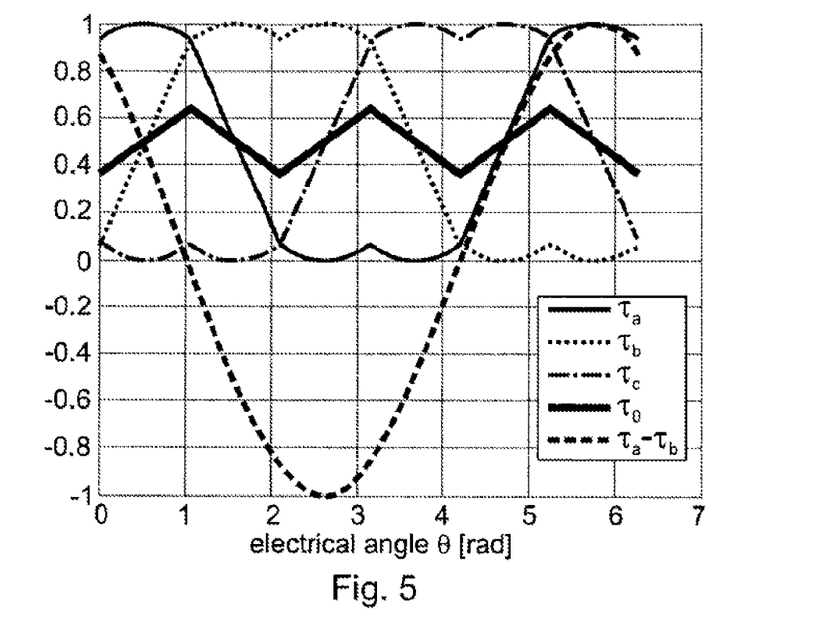

FIGS. 3-5 illustrate modulation methods of a three-phase clocking. The zero system $\tau_0$ has a DC component and a third harmonic with respect to the fundamental of the differential signal in FIGS. 3 and 4. In FIG. 5, the zero system $\tau_0$ comprises a DC component and a delta function. The DC component is in each case selected with a value of 0.5. In FIG. 3, the amplitude $\hat{\tau}$ of the modulation is selected to be 0.2 less than in FIG. 4 with a value for $\hat{\tau}$ of 0.577. The last-mentioned value represents the maximum possible distortion-free fundamental amplitude. This can be seen in FIG. 4 from the fact that the pulse control factors of the individual half-bridges fluctuate predominantly in the region of "one", which corresponds to driving of the inverter at the voltage ceiling.

The modulation method of three-phase clocking is characterized in that all three half-bridges are clocked during a period duration of the pulse width modulation, i.e. the upper switching element and the lower switching element in each half-bridge are each driven complementary to one another and change the switching pattern during each period. The configuration of the zero system or the zero voltage is in this case open. By way of example, a DC component or a DC component with superimposed harmonics of the fundamental which is intended to have the differential signal between in each case two phases are customary.

The characteristic illustrated in FIG. 5 corresponds to a pulse width modulation corresponding to a space vector modulation as shown in FIG. 2. Accordingly, the respective voltage components are formed sectorially from the basic vectors limiting the sector with in each case one of the zero vectors connected. Each sector corresponding to FIG. 2 in this case corresponds to a 60° segment corresponding to the fundamental of the differential signal represented in FIG. 5.

The advantages of three-phase clocking consist in the uniform distribution of the line losses among all components. Disadvantages with the modulation method of three-phase clocking are the permanently occurring switching losses in the switching elements or components.

Figure 6:
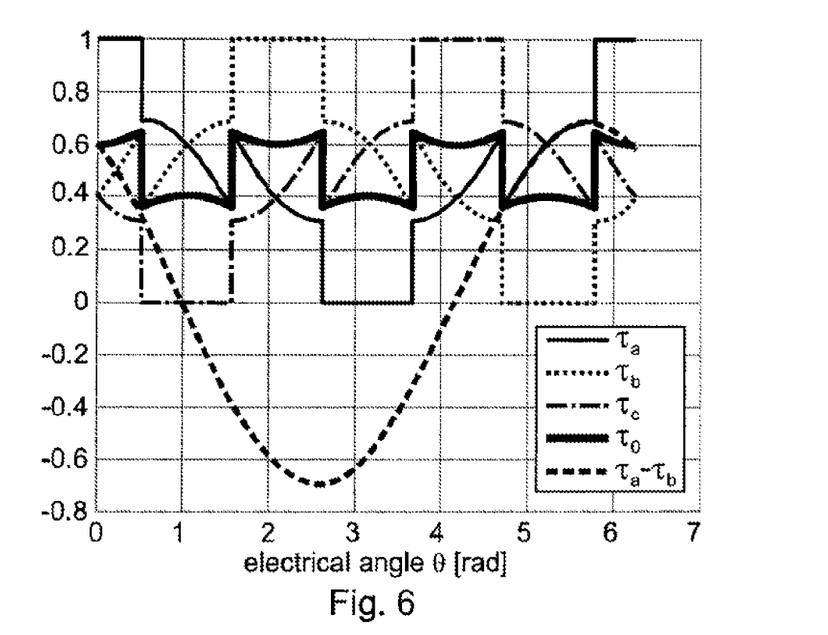
Figure 7:
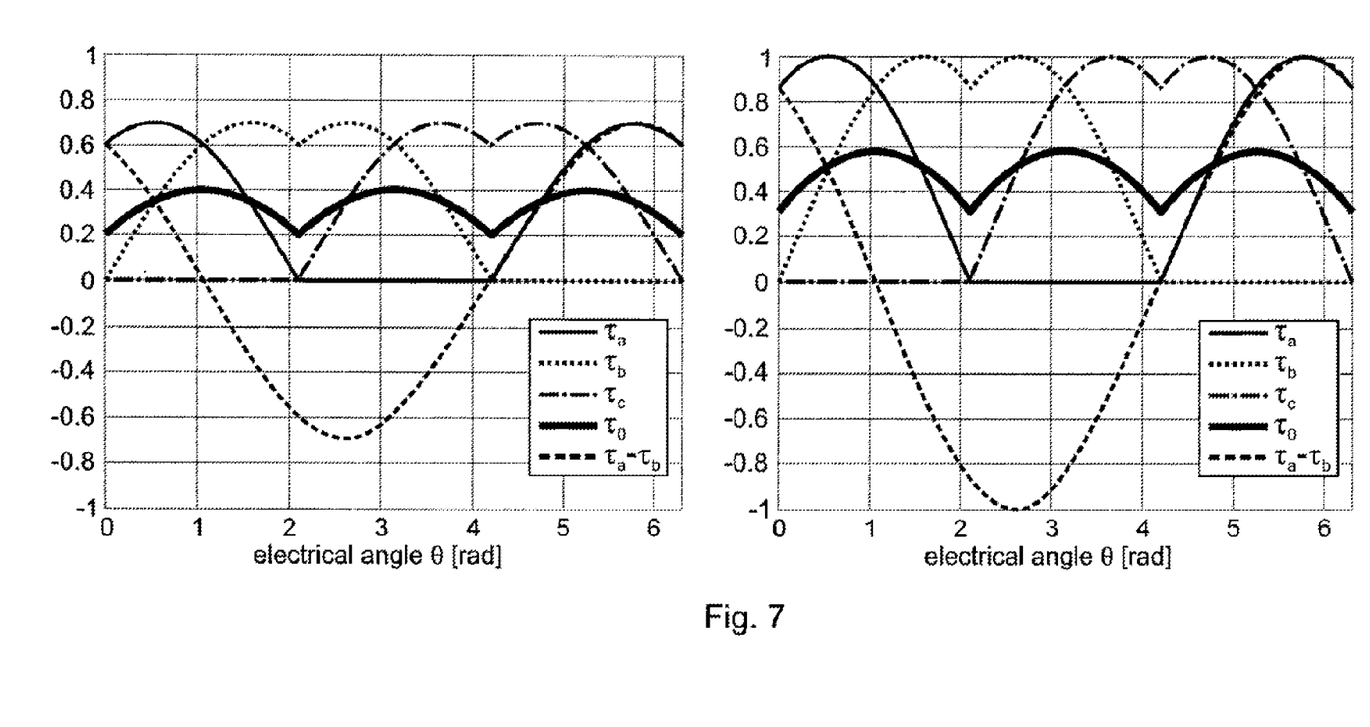

The corresponding time characteristics of the pulse control factors $\tau_a$, $\tau_b$, $\tau_c$, of the zero system $\tau_0$ and of the difference in the pulse control factors $\tau_a-\tau_c$ for modulation methods of two-phase clocking are now illustrated in FIGS. 6-7. Since the selection of the zero system within certain limits is free, the zero system can be configured such that in each case only two of the three half-bridges change their switching pattern during a period of the pulse width modulation. The potential of the in each case third half-bridge remains permanently clamped either to the upper or the lower DC link potential. The modulation method of two-phase clocking is also known as bus-clamped PWM. Based on a complete period of the desired differential signal between two phases, a half-bridge always remains clamped to the upper or lower (as is preferred) DC link busbar for 120° or, for in each case 60°, is alternately clamped to the lower busbar and then another half-bridge clamped to the upper busbar for 60°.

FIG. 6 shows the modulation method of two-phase clocking in accordance with the "60° bus clamped" method, and FIG. 7 shows the modulation method of two-phase clocking in accordance with the "120° bus clamped" method. In FIG. 6 and the illustration on the left in FIG. 7, the value of the amplitude $\hat{\tau}$ is selected as 0.4. In the illustration on the right in FIG. 7, the amplitude has a value of $\hat{\tau}=0.577$, i.e. the maximum possible distortion-free fundamental amplitude. The respective zero system $\tau_0$ results from the corresponding computation specification for the desired two-phase clocking.

Corresponding to FIG. 6, only ever two phases are clocked, wherein the respective third phase is clamped permanently to alternating DC link potential for 60°. In FIG. 7, likewise in each case only two phases are clocked, but the respective third phase is permanently clamped to the same DC link potential for 120°.

The modulation method of two-phase clocking has the advantages of a switching loss which is reduced in total by a third in comparison with the modulation method of three-phase clocking. The switching frequency of the switching elements is a third lower. However, disadvantageously, the permanently clamped switching elements conduct 100% of the current and thus can be more stressed primarily in the case of slow rotating field frequencies than in the modulation method of three-phase clocking.

FIG. 8 now illustrates the modulation method of single-phase clocking. In this case, in each case only one of the three half-bridges changes its switching pattern during a period of the pulse width modulation. Starting from the illustration on the right in FIG. 7, it is clear that the modulation method illustrated as shown in FIG. 8 is possible by virtue of the inverter being operated theoretically above the voltage ceiling, i.e. theoretical pulse control factors for the individual half-bridges of >1 being demanded. In other words, the modulation method of single-phase clocking results in overmodulation, with the result that the fundamental of the output signal can no longer be represented as the difference between in each case two phases without any distortion. In this regard, FIG. 8 illustrates the actually demanded pulse control factors and the resultant differential signals in comparison with the actually set ones using thin dashed lines. The sinusoidal differential signal $\tau_a-\tau_b$ is distorted with respect to a desired sinusoidal characteristic.

The modulation method of single-phase clocking has the advantage of a switching loss which is reduced overall by two thirds in comparison with the modulation method of three-phase clocking. The switch-on frequency of the switchover elements is reduced by two thirds. One disadvantage with a modulation method of single-phase clocking is the distortion of the fundamental. In addition, single-phase clocking requires a special configuration of the control loop since theoretical pulse control factors are preset for the half-bridges which the inverter is actually no longer able to provide.

In the overmodulation range, more output voltage is demanded by the current controllers in the case of field-oriented control than can actually be output. In this case, instead of the actually required pulse control factor of >1, the maximum possible pulse control factor of "one" is selected. In the overmodulation range, large quantities of harmonic currents are generated. The current controllers are then subjected to severe loading by harmonic currents. Current controller saturation and oscillating operations result in a power drop.

Preferably, the switching elements of at least one half-bridge are driven in modified form by virtue of the switching pulses of at least three successive periods being arranged temporally directly next to one another as one switching pulse. As a result, given the same duty factor within the three combined periods, the switching frequency is reduced by a third; the number of switching operations decreases from six in the case of three spaced-apart switching pulses to two for a single cohesive switching pulse. In general, n switching pulses can be combined from n successive periods of pulse width modulation, wherein the switching frequency of the switching elements is reduced by 1/n times. Correspondingly, the switching losses are reduced by 1/n times.

In an advantageous variant embodiment, the switching elements of different half-bridges or phases are driven in modified form at different times. For example, in the case of the modulation methods of two-phase clocking or single-phase clocking, the respectively actively driven or clocked half-bridges and the respective permanently clamped half-bridges alternate. The proposed method in this case provides for the switching elements of in each case one of the actively clocked half-bridges to be driven in modified form with a reduction in the switching frequency and the switching losses.

In a further preferred variant, at least in time segments, the switching elements of a plurality of half-bridges are driven simultaneously. In particular, depending on the selected modulation method of the inverter, the switching elements of a plurality of in each case actively clocked half-bridges are driven simultaneously in modified form with a reduction in their switching frequency.

In order to keep the voltage differences between the individual phases of the inverter even in the case of small average time periods corresponding to the desired voltage characteristic, expediently at least in time segments, at least the switching elements of in each case that half-bridge whose center tap is presently being switched with the greatest duty factor are driven in modified form. This procedure is likewise advantageous for reducing current ripple occurring as a result of the modified method. The switching pulses of the half-bridge switched with the greatest duty factor have temporally the smallest distance from one another in adjacent periods of the pulse width modulation. Arranging these switching pulses next to one another results in this regard in the lowest "pattern shifts" in the PWM signal in comparison with the switching pulses of the other phases.

In addition, preferably the switching elements of the respective other half-bridges which are not controlled with the greatest duty factor are driven by virtue of the time interval of the switching pulses being shortened corresponding to the original time interval of the switching pulses arranged next to one another in the periods corresponding to the modified control. In other words, the switching pulses in at least two or in all of the phases are shifted with respect to one another corresponding to the distance of the switching pulses from the phase controlled at the greatest duty factor. This results in a "pattern shift" which is as low as possible with respect to one another between the individual phases.

The abovementioned shift in the switching pulses of successive periods of the pulse width modulation can be performed with respect to different phases or half-bridges in particular in such a way that a measurement of the phase currents which may be required for current regulation of an electrical consumer can continue to take place with the same clock with the pulse width modulation. If, for example, FIG. 1 is considered, which illustrates a three-phase inverter, the currents in the individual phases $U_a$, $U_b$, $U_c$ given the topology shown can only be measured when the respective half-bridge is clamped to the lower DC link busbar. Within a period of the pulse width modulation, the currents can in particular still be measured with the same clock if two of the three half-bridges are clamped simultaneously to the lower DC link busbar at least in segments. The third, missing phase current can be reconstructed in a rotating field system from the two other measured phase currents.

By pushing the switching pulses onto one another in the pattern of the pulse width modulation for driving the switching elements of one or more half-bridges, previously provided ranges of a possible phase current measurement can be reduced within one period. In particular, central regions between two adjacent periods are "closed" for the current measurement by switching pulses being pushed onto one another. In other words, a measurement of the phase currents in such a case is no longer possible with the clock frequency of the pulse width modulation. During shifting of the switching pulses within one period of the pulse width modulation, however, this circumstance can be taken into consideration, whilst considering the various phases and the various modulation methods, with the result that the possibility of current measurement in clock with the pulse width modulation can be maintained.

Advantageously, the modified driving is performed in time segments depending on a parameter characterizing an AC user connected to the inverter. The AC user is in particular an AC consumer, for example an AC machine. The modified method can be performed in particular depending on a load (for example represented by an electric current, by an electric power, by a torque or by a load temperature), depending on a speed (for example of an AC machine) or depending on a cooling temperature, etc. The modified method can in this case be switched on or off by way of example when a specific value for the corresponding parameter is exceeded or undershot. Depending on the present value for a corresponding parameter, it is also possible to establish the phases in which the switching elements are driven in modified form in each case. In particular, the pattern shifts in the various phases can be performed differently depending on a present value for the parameter under consideration.

Preferably, the parameter used is a parameter characterizing a load state and/or an operating state of the AC user.

The described method can expediently be used for a three-phase rotating field system. Preferably, in this case a three-phase inverter is operated using a modulation method which is selected from the group consisting of three-phase clocking, two-phase clocking, and single-phase clocking, wherein, at least in time segments, the switching elements of at least one of the respectively clocked half-bridges are driven in modified form. Taking into consideration the specific advantages of the respective modulation methods, the switching losses of the switching elements can be further reduced using the modified control method of pulse width modulation.

In an expedient variant, the three-phase inverter is operated using a modulation method of three-phase clocking or two-phase clocking, wherein, at least in time segments, the switching elements of two clocked half-bridges are driven in modified form.

Since current ripple in the phase currents can possibly be generated using the proposed method, the modified voltage, as a compromise, can preferably only be applied for controlling the switching elements of that half-bridge or phase in which the switching losses are high, which is therefore the case at least in one respective actively switched phase or half-bridge. In other words, as already mentioned, in each case at least one of the actively clocked half-bridges is preferably driven in modified form depending on the respectively selected modulation method of the inverter.

In order to reduce negative effects on harmonics, the modified control method is preferably alternated temporally with the regular control method of pulse width modulation. Since, during the modified control, the switching frequency of the switching elements is reduced, this can result in undesired noticeable noise. If the modified control method is alternated with the regular control method, this undesired noise development is also reduced.

In another variant, which likewise results in a reduction in the noise resulting from the reduced clock frequency of the switching elements, the clock frequency of the pulse width modulation is increased at least during the time segments of the modified control.

BRIEF DESCRIPTION OF THE SEVERAL VIEWS OF THE DRAWING

The exemplary embodiments of the invention will be explained in more detail with reference to a drawing, in which.

DESCRIPTION OF THE INVENTION

FIGS. 1-2 and 3-8 are already explained in detail in connection with the description of the invention. Correspondingly, reference is made to the passages of the description in this regard.

Figure 9:
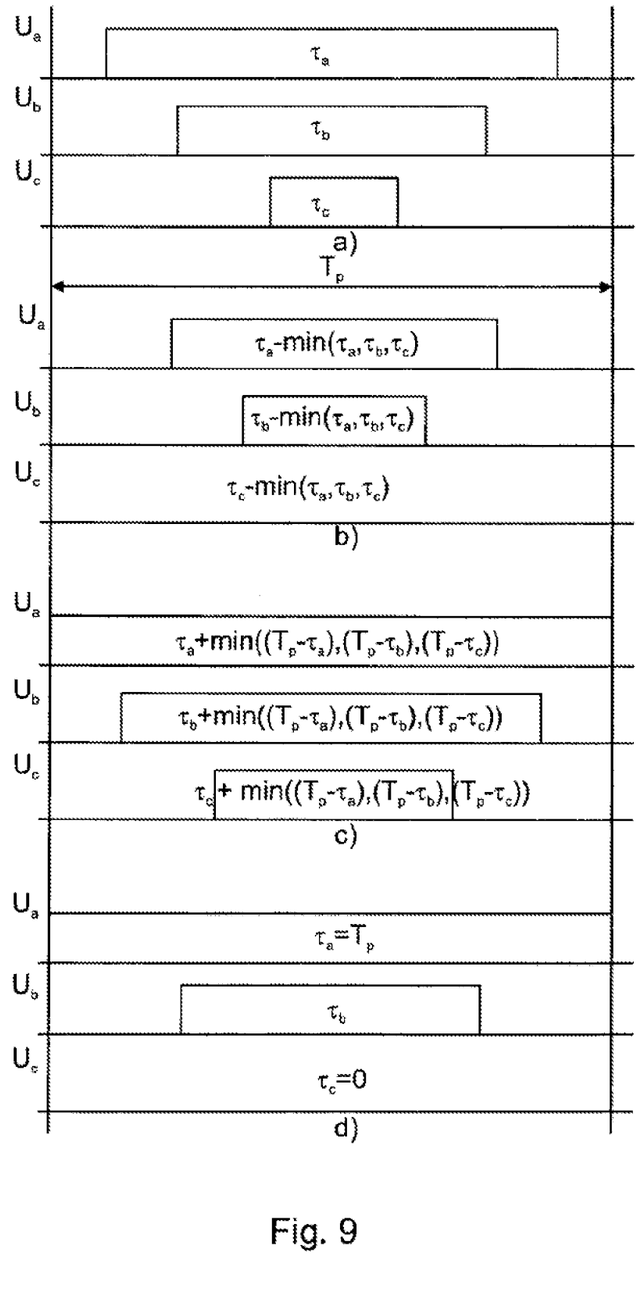
FIG. 9 shows the various modulation methods for a three-phase inverter, in each case as an instantaneous illustration of a PWM period.

FIG. 9 shows an instantaneous illustration of a PWM period of a PWM signal for driving a three-phase inverter corresponding to FIG. 1. The period duration $T_p$ is shown. FIG. 9 shows four different modulation methods of the three-phase inverter corresponding to the illustrated variants a), b), c) and d). For each of the illustrated variants, the three phases are labeled by their phase voltages $U_a$, $U_b$ and $U_c$. Furthermore, the respective on times $\tau_a$, $\tau_b$, $\tau_b$ corresponding to FIGS. 3-8 or corresponding to the above description within a period are illustrated as switching pulses of different duration. The ratio of the pulse duration to the period duration $T_p$ gives the desired duty factor and therefore the voltage set on average on the corresponding phase. A switching pulse $\tau$, in accordance with the above-described definitions, corresponds to switching of the center tap of the corresponding half-bridge to the upper DC link busbar. Outside the switching pulse, $\tau$ has the value zero, with the result that, in these regions of the illustrated period, the center tap of the respective half-bridge is clamped to the lower DC link busbar.

The variant a) shown in FIG. 9 corresponds to the modulation method of three-phase clocking for an inverter corresponding to FIG. 1. At any time and in particular at the present time illustrated, all three phases or all three half-bridges are clocked. Switching pulses occur in all phases of the PWM signals.

Variants b) and c) correspond to modulation methods of two-phase clocking, as are illustrated in FIGS. 6 and 7. According to variant b), a phase (identified by $U_c$) is clamped permanently to the lower DC link busbar. The other phases $U_a$ and $U_b$ are clocked. Variant b) therefore corresponds to the modulation method of two-phase clocking as shown in FIG. 7.

In variant c), the phases $U_b$ and $U_c$ are clocked. In segments (in the present case at the present time illustrated), the phase $U_a$ or the center tap of the corresponding half-bridge is clamped to the upper DC link potential. Variant c) corresponds to the modulation method of two-phase clocking, as is shown in FIG. 6.

According to variant d), two phases ($U_a$, $U_c$) or the center taps of the corresponding half-bridges are clamped to the upper and lower DC link busbar, respectively. Only one phase (identified by $U_b$) is clocked. Variant d) corresponds to the modulation method of single-phase clocking, as is illustrated in FIG. 8.

In addition, computation specifications are illustrated in FIG. 9 in respect of how the pulse control factors $\tau_a$, $\tau_b$, $\tau_c$ of the respective modulation methods result from the corresponding pulse control factors of the symmetrical modulation method of three-phase clocking.

Figure 10:
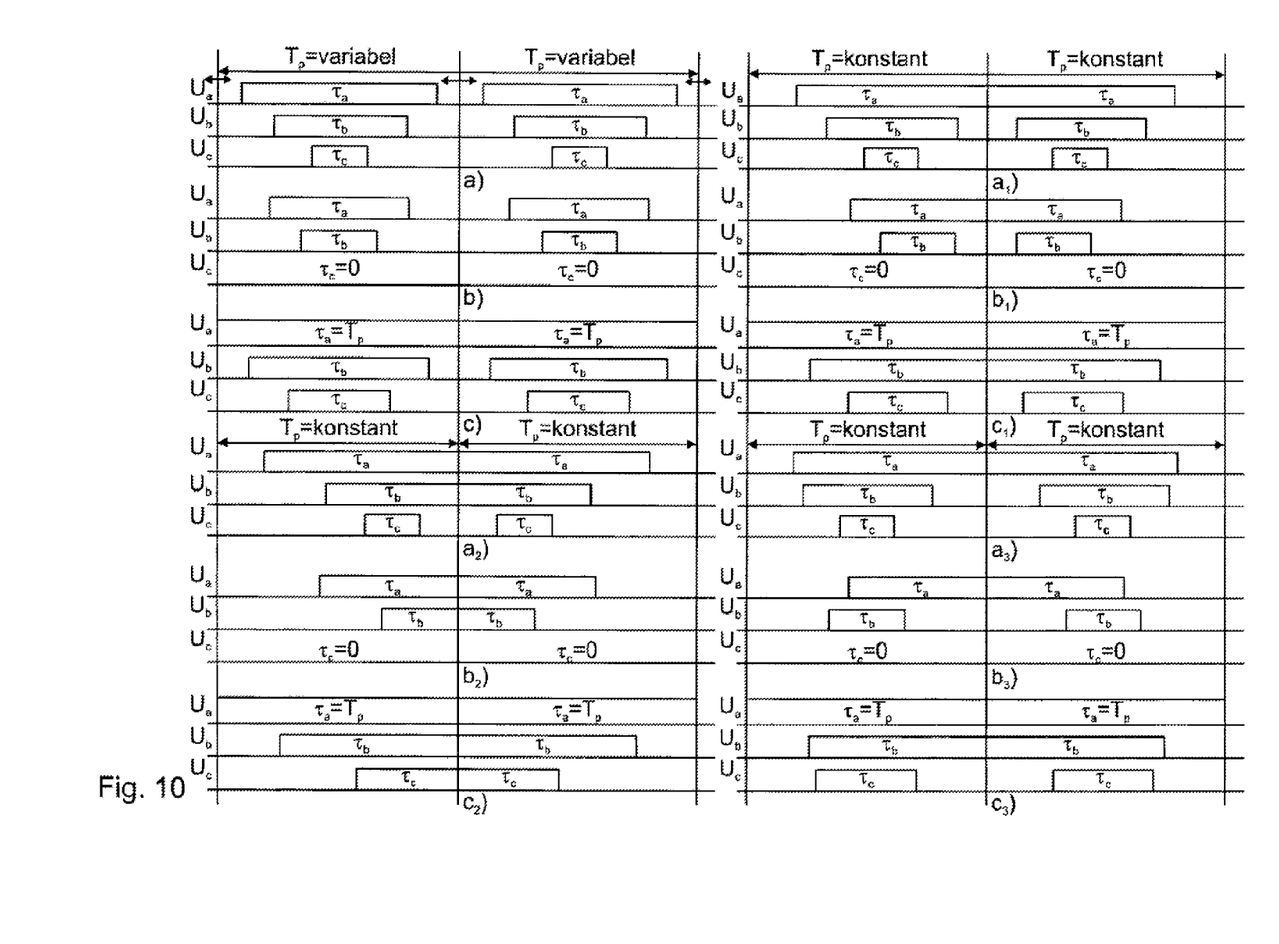
FIG. 10 shows, for various modulation methods of a three-phase inverter, instantaneous illustrations of a PWM period with modified control method.

FIG. 10 illustrates, in two illustrations next to one another, two successive periods of a PWM signal corresponding to FIG. 9. The phases, the on times and the period durations are labeled correspondingly.

In FIG. 10, in the illustration on the left, variants a), b) and c) of various modulation methods for a three-phase inverter are illustrated for better understanding once again corresponding to FIG. 9. The further variants represent a modified control method, wherein switching pulses of successive periods are arranged next to one another to form a single switching pulse, as a result of which the switching frequency of the switching elements and correspondingly the switching losses are reduced.

In variants $a_1$), $b_1$) and $c_1$), the switching pulses of that phase which is driven at the greatest duty factor are arranged next to one another. Corresponding to the "pushed-together" distance of these longest switching pulses, the switching pulses of the respective other phases are also pushed against one another. In variant $a_1$) and $b_1$), in each case the switching pulses of the phases $U_a$ are pushed against one another and combine to form a single switching pulse. The switching pulses of the respective other phases are temporally arranged close to one another correspondingly. A measurement of the phase currents corresponding to the topology shown in FIG. 1 is further possible in clock with the pulse width modulation.

In variant $c_1$), the switching pulses of two adjacent periods for the phase $U_b$ are pushed against one another and combine to form a single switching pulse. The switching pulses in the phase $U_c$ come temporally closer to one another. The measurement of the phase currents is no longer possible in clock with the pulse width modulation since the distance between those regions in which at least two half-bridges are clamped onto the lower DC link busbar (a zero value occurs within the period) is increased.

In variants $a_2$), $b_2$) and $c_2$), in addition the switching pulses of the adjacent period of a further phase are pushed against one another. In variants $a_2$) and $b_2$), these switching pulses are the switching pulses of the phases $U_b$. In variant $c_2$), these are the switching pulses of the phase $U_c$.

Variants $a_3$), $b_3$) and $c_3$) differ from variants $a_1$), $b_1$) and $c_1$) in that the switching pulses remain without any temporal displacement in the phases driven without any modification.

Figure 11:
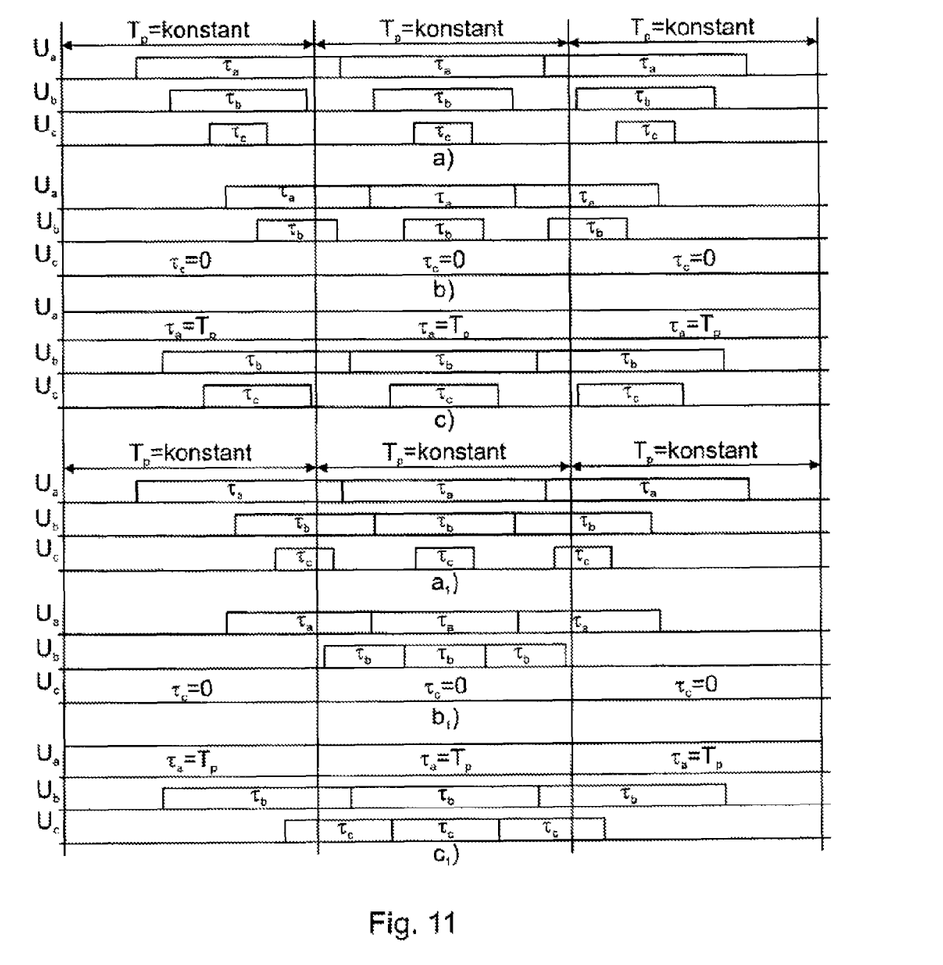
FIG. 11 shows, for various modulation methods of a three-phase inverter, instantaneous illustrations of a PWM period with modified control, wherein switching pulses of three successive periods are arranged next to one another.

FIG. 11 illustrates the instantaneous state for three successive periods of the pulse width modulation. In variants a), b) and c), the switching pulses of the respective phase or half-bridge driven at the greatest duty factor of three successive periods are arranged next to one another and combine to form a single switching pulse. The switching pulses of the respective other phases are shifted toward one another with the same temporal offset. It is clear that, in the phase driven with modification, the switching frequency is reduced by a third.

In variants $a_1$), $b_1$) and $c_1$), the switching pulses of in each case one further active phase are likewise arranged next to one another and combine to form a single switching pulse. In variants $a_1$) and $b_1$), the switching frequencies and therefore the switching losses in the phases $U_b$ are additionally reduced by a third. In variant $c_1$), the switching frequency and the switching losses are additionally reduced in the phase $U_c$ by a third.

Figure 12:
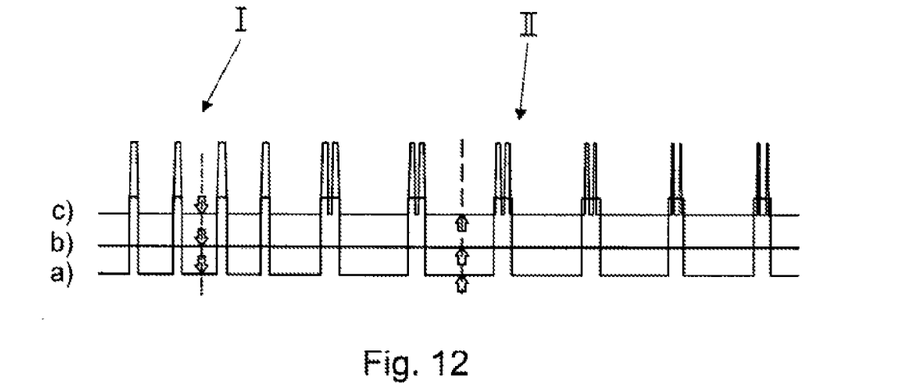
FIGS. 12-14 show various time sequences of switching pulses for a three-phase inverter using the modified control method.
Figure 13:
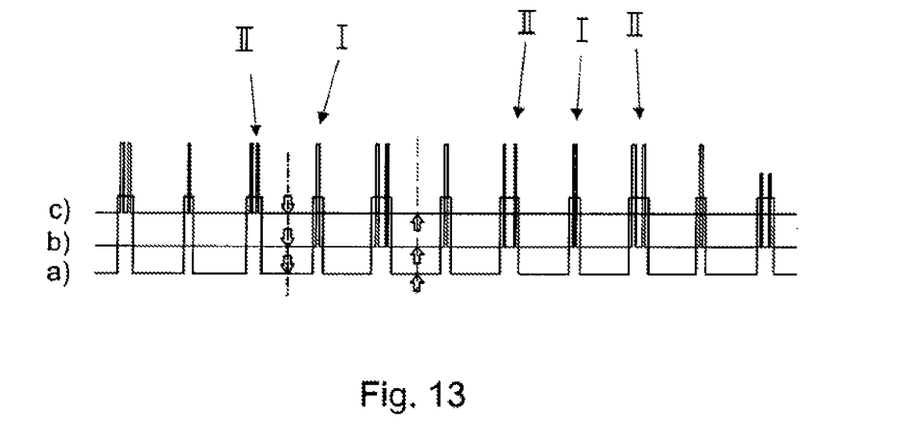
Figure 14:
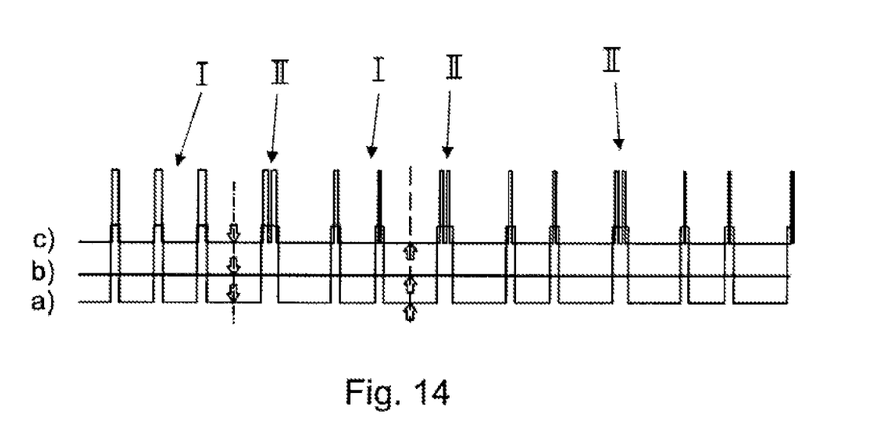

FIGS. 12-14 illustrate time sequences of PWM signals for driving the switching elements in the half-bridges of a three-phase inverter corresponding to FIG. 1. The switching signals for the individual half-bridges or phases are identified by a), b) and c).

In FIG. 12, there is a change after region I with regular driving of the switching elements to a region II with a modified driving. In region II, the switching pulses of the half-bridge or phase a) of in each case two adjacent periods are combined to form a single correspondingly lengthened switching pulse. The switching pulses of the half-bridge or phase c) are moved closer to one another correspondingly. The half-bridge or phase b) is not clocked.

In FIG. 13, regions I of regular PWM clocking alternate with regions II of modified PWM clocking. In each case the half-bridge or phase a) is driven in modified form. The switching pulses of the other phases b) and c) move closer to one another correspondingly.

In FIG. 14, again regions I of regular PWM clocking alternate with regions II of modified PWM clocking. In each case two periods with "unshifted" switching pulses are present between two combined switching pulses.

The invention claimed is:

1. A method of controlling a polyphase inverter, the polyphase inverter having a plurality of half bridges switched into a DC link with an upper busbar and a lower busbar, having switching elements, and center taps between the switching elements, the method comprising:
    by clocked switching of the switching elements with pulse width modulation, connecting respective center taps of the half bridges to the upper busbar or to the lower busbar of the DC link; and
    driving the switching elements of at least one half-bridge in modified form at least during given time segments by temporally arranging the switching pulses of at least two successive periods of the pulse width modulation directly next to one another as one switching pulse;
    wherein a number of switching cycles is reduced when performing the step of driving the switching elements of the at least one half-bridge in the modified form in comparison to a situation where the switching elements of the at least one half-bridge is not driven in the modified form.

2. The method according to claim 1, which comprises driving the switching elements of at least one half bridge in modified form by arranging the switching pulses of at least three successive periods temporally directly next to one another as one switching pulse.

3. The method according to claim 1, which comprises driving the switching elements of different half bridges in modified form at different times.

4. The method according to claim 1, which comprises, at least in time segments, simultaneously driving the switching elements of a plurality of half bridges in modified form.

5. The method according to claim 1, which comprises performing the step of driving the switching elements of the at least one half-bridge in the modified form at least during the given time segments depending on a parameter characterizing an AC user connected to the inverter.

6. The method according to claim 1, which comprises controlling a three phase inverter.

7. The method according to claim 1, which comprises effecting the modified control and the regular control in temporal alternation.

8. The method according to claim 1, which comprises increasing a clock frequency of the pulse width modulation at least during the time segments of the modified control.

9. The method according to claim 4, which comprises driving the switching elements of the respectively other half bridges by shortening a time interval of the switching pulses corresponding to an original time interval of the switching pulses arranged next to one another in periods of a modified control.

10. The method according to claim 5, wherein the parameter is a parameter characterizing a load state and/or an operating state of the AC user.

11. The method according to claim 6, which comprises operating the three phase inverter using a modulation method selected from the group consisting of three phase clocking, two phase clocking, and single phase clocking, and thereby driving, at least in time segments, the switching elements of at least one of the respectively clocked half bridges in modified form.

12. The method according to claim 1, which comprises, at least in time segments, driving in modified form the switching elements of a given half-bridge whose center tap is presently being switched with a greatest duty factor.

13. The method according to claim 11, which comprises operating the three phase inverter using a modulation method of three phase clocking or two phase clocking, and thereby driving, at least in time segments, the switching elements of two clocked half bridges in modified form.

14. The method according to claim 12, which comprises driving the switching elements of the respectively other half bridges by shortening a time interval of the switching pulses corresponding to an original time interval of the switching pulses arranged next to one another in periods of a modified control.

* * * * *